(12) United States Patent
Benesch

(10) Patent No.: US 10,530,145 B2
(45) Date of Patent: Jan. 7, 2020

(54) METHOD AND DEVICE FOR DETECTING PHASE FAILURES, IN PARTICULAR NETWORK FAULTS, IN A CONVERTER

(71) Applicant: SIEMENS AKTIENGESELLSCHAFT, München (DE)

(72) Inventor: Norbert Benesch, Heroldsberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/095,214

(22) PCT Filed: Feb. 9, 2017

(86) PCT No.: PCT/EP2017/052859
§ 371 (c)(1),
(2) Date: Oct. 19, 2018

(87) PCT Pub. No.: WO2017/182153
PCT Pub. Date: Oct. 26, 2017

(65) Prior Publication Data
US 2019/0148932 A1    May 16, 2019

(30) Foreign Application Priority Data
Apr. 20, 2016    (EP) .................... 16166214

(51) Int. Cl.
*H02H 3/26* (2006.01)
*H02H 7/08* (2006.01)
(Continued)

(52) U.S. Cl.
CPC .......... *H02H 3/265* (2013.01); *H02H 7/0833* (2013.01); *H02H 11/006* (2013.01); *H02P 8/12* (2013.01); *H02P 29/0243* (2016.02)

(58) Field of Classification Search
CPC ........................... H02H 3/265; H02P 29/0243
See application file for complete search history.

(56) References Cited

U.S. PATENT DOCUMENTS 5,204,607 A * 4/1993 Hugel .................. H02P 21/06
318/806
5,467,000 A * 11/1995 Bauer ............... H02M 7/53875
318/432

(Continued)

FOREIGN PATENT DOCUMENTS

| CN | 103560737 A | 2/2014 |
| CN | 104730408 A | 6/2015 |

(Continued)

*Primary Examiner* — Scott Bauer
(74) *Attorney, Agent, or Firm* — Henry M. Feiereisen LLC

(57) ABSTRACT

In a method and a corresponding device for detecting phase failures in a converter, current regulators of a positive phase sequence system and current regulators of a negative phase sequence system are provided for the current control of the converter, wherein the current regulators of the positive phase sequence system and the current regulators of the negative phase sequence system each have an integrator, resulting, in the case of a network fault, in coupling of the integrators. At least one measured or calculated value is checked by a monitoring unit for a course that is typical of the coupling of the integrators, wherein the monitoring unit generates a fault signal if such a typical course is detected.

9 Claims, 4 Drawing Sheets

(51) Int. Cl.
    *H02H 11/00*     (2006.01)
    *H02P 8/12*     (2006.01)
    *H02P 29/024*     (2016.01)

(56) References Cited

U.S. PATENT DOCUMENTS

| | | | |
|---|---|---|---|
| 8,467,210 B2 * | 6/2013 | Gerner | H02J 3/1835 363/96 |
| 2011/0241723 A1 | 10/2011 | Abel | |
| 2015/0177335 A1 | 6/2015 | Halt et al. | |

FOREIGN PATENT DOCUMENTS

| | | |
|---|---|---|
| DE | 102007008191 A1 | 8/2008 |
| DE | 102008055012 A1 | 6/2010 |
| WO | WO 2008061698 A2 | 5/2008 |

* cited by examiner

METHOD AND DEVICE FOR DETECTING PHASE FAILURES, IN PARTICULAR NETWORK FAULTS, IN A CONVERTER

CROSS-REFERENCES TO RELATED APPLICATIONS

This application is the U.S. National Stage of international Application No. PCT/EP2017/052859, filed Feb. 9, 2017, which designated the United States and has been published as International Publication No. WO 2017/182153 and which claims the priority of European Patent Application, Serial No. 16166214.3, filed Apr. 20, 2016, pursuant to 35 U.S.C. 119(a)-(d).

BACKGROUND OF THE INVENTION

The invention relates to a method and device for detecting phase failures, in particular phase failures in the form of line failures, in a converter, in particular in a converter connected to a supplying line.

To protect expensive workpieces during the production process in a machine tool, phase failures, in particular line phase failures, must be detected quickly and reliably and the equipment placed e.g. in a safe operating state on the basis of such detection. This is in order to protect the workpiece currently being processed e.g. in a multi-axis lathe/milling machine from damage caused by unwanted/uncoordinated movement of the machine axes due to a power supply dip. Because the value of machined workpieces is sometimes in the six-figure or even in the seven-figure range, a high outlay for protecting such workpieces is justified.

The approach described in the following is suitable for use in machine tools, particularly metal-cutting machine tools, and other production machines. The term machine tool commonly refers to all machines which are used among other things in mechanical engineering and toolmaking for processing workpieces using tools. On the other hand, an industrial robot is an all-purpose, programmable production machine which is designed and set up not only to process workpieces but alternatively also to handle workpieces and for assembly purposes. Here and in the following, the expression machine tool is used generically for terms such as machine tool, production machine, industrial robot and the like.

If an impending line failure or disturbance is suspected, precautionary retracting movements of the machine axes of a machine tool shall be initiated. The overall concept of the machine tool must be geared to this requirement. Machine tool manufacturers demand corresponding functions from the integrated drive and control units.

In such applications, a self-commutated IGBT bridge converter is typically used as a dynamic line inverter with feedback capability. The converter controls the DC link voltage of the drive group and impresses (e.g. using pulse width modulation PWM) sinusoidal line currents which result in the necessary power flow to the line. In order to keep the pulse frequency components of the converter output voltage away from other line users, line filters are used which typically contain inductors and at least one capacitor in the filter branch. The converter is typically controlled such that the reactive power demand at the connection point of the filter is virtually zero, i.e. apart from the higher-frequency distortion components, pure active current is exchanged with the line (displacement factor cos $\varphi$=1). The reactive power demand of the capacitor in the line filter is provided for this purpose by the converter.

The comparatively frequently occurring event of a line voltage dip or of a short circuit or ground fault does not need to be considered in the following, as the associated large voltage difference between inverter and dipped supply voltage results in a large current which can be easily detected. In addition, large variations in the voltage amplitude can be easily detected using voltage sensing and/or model calculations of the connection voltage.

On the other hand, a different situation arises in the event of a high-resistance failure of a line phase. A typical example of this is the tripping of a cutout in a line phase. The voltage of the lost line phase is retained and simulated by the capacitor of the line filter required for operating the converter. Particularly under no-load conditions, the detection of a high-resistance line failure therefore becomes a problem for which a solution is proposed here. On the basis of the thus possible detection of a high-resistance supply failure, a machining step can be preventing from starting in the machine tool, for example, if a branch cutout has previously tripped.

The high-resistance failure of more than one line phase is—because of interrupted energy flow of the 3-conductor connection—once again insignificant and will not therefore be considered here. For example, such a situation could be detected from the interrupted current flow or from the abruptly changing voltage at the line filter.

Although the approach presented here is explained taking the example of a line-side use of a PWM inverter, it is equally applicable to motor-side inverters with sine wave output filter (having longitudinal inductance and transverse capacitance). The topology and the control methods can be used in a basically similar manner, merely replacing the block "line" by an electrical motor, in particular a synchronous motor. This can be explained by the fact that line supplies are typically created using electrical generators, which means that, even in the case of a line inverter, the block "line" can consist of an electrical machine.

An object of the present invention is to specify a method for detecting phase failures, in particular phase failures in the form of single-phase line phase interruptions hereinafter referred to a line faults for short, in particular for detecting line faults during no-load or part-load operation of active line inverters with line filters.

SUMMARY OF THE INVENTION

For the method for detecting phase failures in a converter, particularly line faults, namely single-phase line phase interruptions, in a converter connected to a supplying line, on the one hand current controllers of a positive phase sequence system and, on the other hand, current controllers of a negative phase-sequence system are provided for current control of the converter, wherein both the current controllers of the positive phase sequence system and the current controllers of the negative phase sequence system have integrators or integral-action components. The positive phase sequence system and the negative phase sequence system are designed such that the integrators of the respective current controllers are normally, i.e. in the absence of a line fault, decoupled. In the event of a line fault, coupling of the hitherto decoupled integrators and therefore a deliberate instability results. This instability produces, for different measured or calculated values, a response that is typical of the coupling of the integrators and hence of the underlying line fault. The response of the or each measured or calculated value in question is checked by means of a monitoring unit and the monitoring unit detects a response of the respective measured or calculated value that is typical of a line fault. An example of a possible measured or calculated value for detecting a line fault are the absolute values of the integrators of the current controllers of the negative phase sequence system. In the event of such a response typical of a network fault being detected, the monitoring unit generates a fault signal so that operating personnel are made aware of the fault situation and/or an automatic reaction to the line fault, e.g. In the form of shutdown of the machine tool, becomes possible.

A device designed and set up to carry out the method, namely to detect phase failures in a converter, in particular line faults in a converter connected to a supplying AC line, comprises, on the one hand, current controllers of a positive phase sequence system and, on the other hand, current controllers of a negative phase sequence system for current control of the converter, wherein the current controllers of the positive phase sequence system and the current controllers of the negative phase sequence system have integrators or integral-action components. As already explained above, the positive phase sequence system and the negative phase sequence system are designed such that the integrators of the respective current controllers are normally, i.e. in the absence of a line fault, decoupled. However, in the event of a line fault, coupling of the integrators results and a response of one or more measured or calculated values that is typical of the coupling of the integrators can be detected by means of a monitoring unit. In the event of such a typical response being detected, the monitoring unit can also generate a fault signal which can be evaluated, for example, for automatic reactions to the fault situation detected.

The advantage of the invention is that phase or line faults of the type mentioned in the introduction, which typically arise because of tripping of a line cutout, can be detected even before the start of a production cycle and, on this basis, a timely warning or shutdown of a machine, e.g. a machine tool, connected to the line inverter is possible. In the case of a machine tool connected to the line inverter, this provides an effective means of protecting workpieces from damage which may otherwise occur due to aborted production processes.

Another advantage of using the approach described here is that normal operation of the line inverter is not interrupted or disturbed by test signals for fault detection, as is otherwise necessary to prevent reactions on the line voltage. Idle times in the production process are not therefore incurred. Moreover, the proposed method is basically also applicable to phase failure detection for motor inverters with sine wave output filter.

Other advantages of the invention are a short detection time—a line fault can typically be detected in less than one second using the approach described here—and negligible effects on the stability and robustness of the usual current and DC link voltage control. This is due primarily to the fact that no disturbing line effects arise due to the outputting of test signals or similar that are often necessary for active detection methods. The method is robust and reliable and allows assured detection without erroneous activation even in the event of supply voltages overshoots or supply impedance changes. Lastly, the method is all-purpose, i.e. it can be used both for "small" inverters in the kW range and also for "large" inverters in the MW range with/without voltage measurement in the line filter and different filter topologies. Also the low computational requirement of the method makes it usable in the booksize environment in multi-axis groups for machine tools without limitation of the maximum number of axes per control unit.

Advantageous embodiments of the invention are set forth in the sub-claims. Back-references used in said sub-claims relate to further refinements of the subject matter of the main claim by virtue of the features of the particular sub-claim. They are not to be understood as a waiver of the achievement of independent, objective protection for the combination of features of the sub-claims to which they refer. In addition, having regard to an interpretation of the claims in the case of a more detailed concretization of a feature in a subordinate claim, it is to be assumed that such a restriction does not exist in the respective preceding claims. Lastly it is pointed out that the method specified here can also be further developed according to the dependent device claims and vice versa.

In an embodiment of the method, limiting blocks are provided in the negative phase sequence system to limit the ramp-up of the integrators of the negative phase sequence system. By means of the limiting blocks, the output of the negative phase sequence system control circuit can be limited, thus allowing fault ride-through, in particular of the line fault, while still ensuring reliable detection.

In another embodiment of the method it is provided that the negative phase sequence system is not continuously active and is activated as and when required depending on an average power consumption of the converter, e.g. only under no-load or partial load conditions. This takes account of the fact that if the line currents are sufficiently large, a line fault in the form of a phase separation can also be detected in other ways, e.g. on the basis of the harmonic components at twice the line frequency in the DC link voltage, of the instantaneous power, of the active current, of the reactive current, etc. Such variables can be easily evaluated in per se known manner using a bandpass filter and threshold value monitoring of the bandpass filter output.

In yet another embodiment of the method, the negative phase sequence system is deactivated if the average power consumption of the converter exceeds a predefined or predefinable threshold value. Such a deactivation of the negative phase sequence system control can be useful, for example, in order to increase the stability of the overall control in the case of high power or to reduce the computational load.

The above stated object is also achieved using a control device acting as a converter control unit for controlling a converter, said control device operating according to the method as described here and in the following and comprising, for this purpose, means for carrying out the method. The invention is preferably implemented in software or in software and firmware. The invention is therefore on the one hand also a computer program comprising program code instructions executable by a computer and, on the other hand, a storage medium containing such a computer program, i.e. a computer program product with program code means, and finally also a converter control unit into whose memory such a computer program is or can be loaded as a means of carrying out the method and the embodiments thereof. Where method steps or method step sequences are described in the following, this relates to actions which take place automatically on the basis of such a computer program or automatically under the control of the computer program.

Instead of a computer program having individual program code instructions, the method described here and in the following can also be implemented in firmware form. It will be clear to persons skilled in the art that instead of an implementation of the method in software, an implementation in firmware or in firmware and software or In firmware and hardware is always possible. For the description presented here, this means that the term software or the term computer program also includes other possible implementations, namely in particular an implementation in firmware or in firmware and software or in firmware and hardware.

An exemplary embodiment of the invention will now be explained in greater detail with reference to the accompanying drawings. Mutually corresponding items or elements are provided with the same reference characters in all the figures.

The exemplary embodiment is not to be understood as a limitation of the invention. This applies particularly with regard to the description on the basis of a line fault. As mentioned in the introduction, the approach can equally be used for motor-side converters. This is always implicit in the following. Moreover, additions and modifications are also completely possible within the scope of the present disclosure, in particular those which e.g. by combination or variation of individual features or method steps described in connection with those in the general or specific section of the description and contained in the claims and/or accompanying drawings will be understood by persons skilled in the art in respect of achieving the stated object and, through combinable features, result in a new item or new method steps I method step sequences.

DETAILED DESCRIPTION OF PREFERRED EMBODIMENTS

Figure 1:
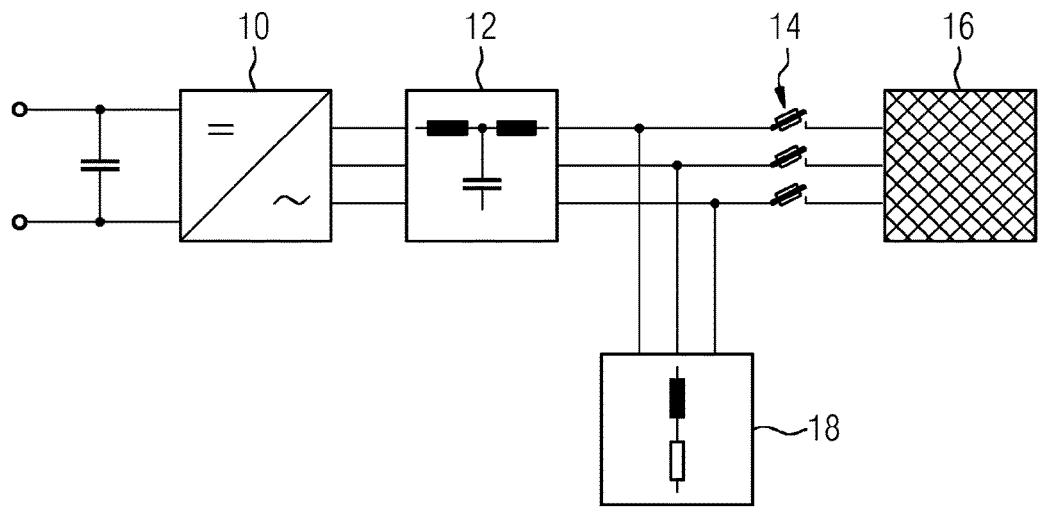
FIG. 1 shows a system comprising a converter.

FIG. 1 shows a simplified illustration of a system (converter group) comprising a line inverter 10 referred to in the following as an inverter, power converter or converter 10 for short, having a line filter 12 with commutating reactor (longitudinal inductance) and filter shunt arm with a capacitor (transverse capacitance) and having connecting lines with disconnecting points 14 to a supplying line 16 to which other components 18 may also be connected. It has already been explained in the introduction that the approach proposed here is also applicable to motor-side inverters. In which case the entity referred to as the line 16 here would be understood to be a motor.

Figure 2:
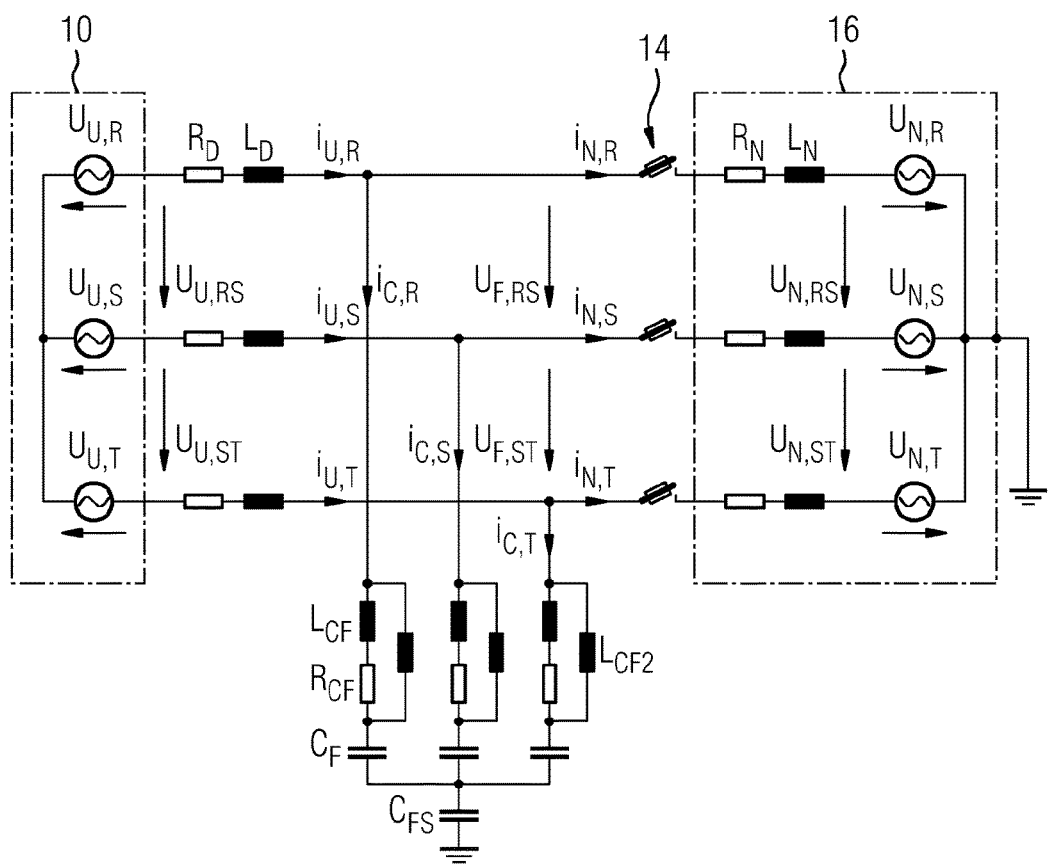
FIG. 2 shows another illustration of the system according to FIG. 1 with additional details.

FIG. 2 shows a simplified representation of the system according to FIG. 1 with additional details, namely the pulsed/switched, in particular pulse-width-modulated output voltage $U_U$ of the converter 10 as well as commutating reactor, line filter shunt arm with capacitor and possibly other components 18 (here additionally with neutral grounding), connection point with disconnecting point 14, concentrated line inductance and ideal line voltage source $U_N$. A high-resistance supply failure is simulated by single-phase opening at the disconnecting point 14 between line filter 12 and line inductor. Depending on the design of the line filter 12, instead of or in addition to the use of reactors in the filter shunt arm, an inductance can also be present between shunt arm and disconnecting point.

The problem to be addressed by the invention can be simply illustrated by the circuit according to FIG. 2: As the converter 10 regulates to cos φ=1 at the connection point to the line 16 (disconnecting point 14), under no-load conditions ($P_{Wirk} \approx 0$) the converter current is approximately equal to the filter current. Then $i_{U,RST} \approx i_{C,RST}$ and $i_{N,RST} \approx 0$. Obviously this limit case is not exactly attained, as at least the intrinsic losses within the system must be covered from the line current $i_{N,RST}$. However, it becomes clear that an open phase at no-load has only minimal effect on the current and voltage relationships at the converter 10.

The detection of a high-resistance failure of a line phase is designed to operate even without measurement of the filter voltages $u_{F,RS}$, und $u_{F,ST}$, as a device-external voltage measurement required for that purpose is not generally provided in small converters 10 for reasons of cost. However, even if these measured variables were available, it would be of little help: The capacitor voltage at a high-resistance line branch will approximately follow the fundamental component response of the corresponding converter output voltage and will not therefore ensure reliable state detection. This is the case at least as long as the converter 10 in pulsing mode is acting as a voltage source. On the other hand, under pulse inhibition (the IGBT inverter then operates merely as a diode rectifier) the missing line voltage can be unambiguously measured.

The larger the instantaneous apparent power of the converter group, the greater the obviously resulting current and voltage deviations from an expected response. This explains how, above a partial load threshold, phase failure detection is ensured using the monitoring facilities already implemented today (deviation of the line phase angle from the expected response, deviation of the active current and DC link voltage from the expected response).

Figure 3:
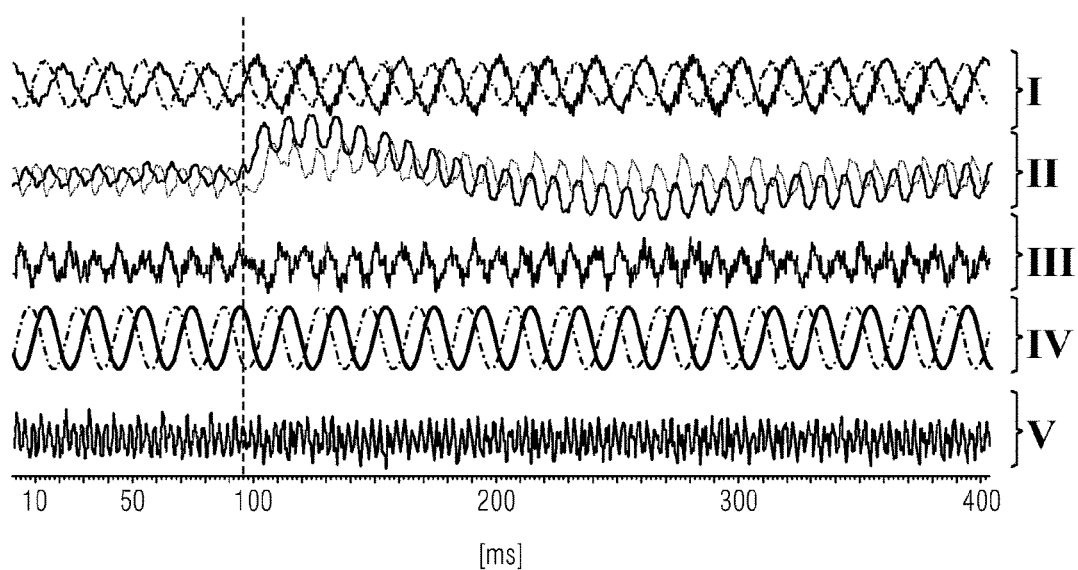
FIG. 3 shows graphs of characteristic variables of the system according to FIG. 1, FIG. 2.

To illustrate the underlying problem, FIG. 3 shows a measurement on a real test set-up, namely (from top to bottom) the phase currents between converter 10 (active line module; ALM) and line filter 12 (section I), the integral-action components of active and reactive current controller (section II), the DC link voltage $V_{DC}$ (section III), the measured filter voltages $u_{F,RS}$ and $u_{F,ST}$ (section IV), and the degree of saturation, i.e. the output voltage of the converter 10 referred to the DC link voltage (section V). At time t=96 ms, the phase S is opened, i.e the variable $i_{N,S}=0$ is switched. As the reactive current requirement of the line filter 12 is impressed by the converter 10 and the other line currents $i_{N,R}$ and $i_{N,T}$ are therefore also very small, there arise no significant changes in system variables which would be usable for robust detection of a line fault. This also applies particularly to the filter voltages $u_{F,RS}$ and $u_{F,ST}$ as well as the phase currents $i_{U,R}$, $i_{U,S}$ and $i_{U,T}$ of the converter 10. At least the latter are generally available as measured variables; in many applications the filter or rather line voltages are only calculated using models.

The approach proposed here uses the method of segmenting a three-phase system into symmetrical components. This mathematical approach means that a three-phase voltage/current system with any, i.e. even unequal amplitudes, can be broken down into a plurality of voltage/current sources which each have the same amplitude in all three branches (i.e. are symmetrical). The three-phase system is subdivided into a zero-sequence system which acts identically in all three branches without mutual phase displacement, and two three-phase voltage/current systems each having 120° phase displacement between the branches and possessing a positive direction of rotation (positive phase sequence system 20) or a negative direction of rotation (negative phase sequence system 22).

Figure 4:
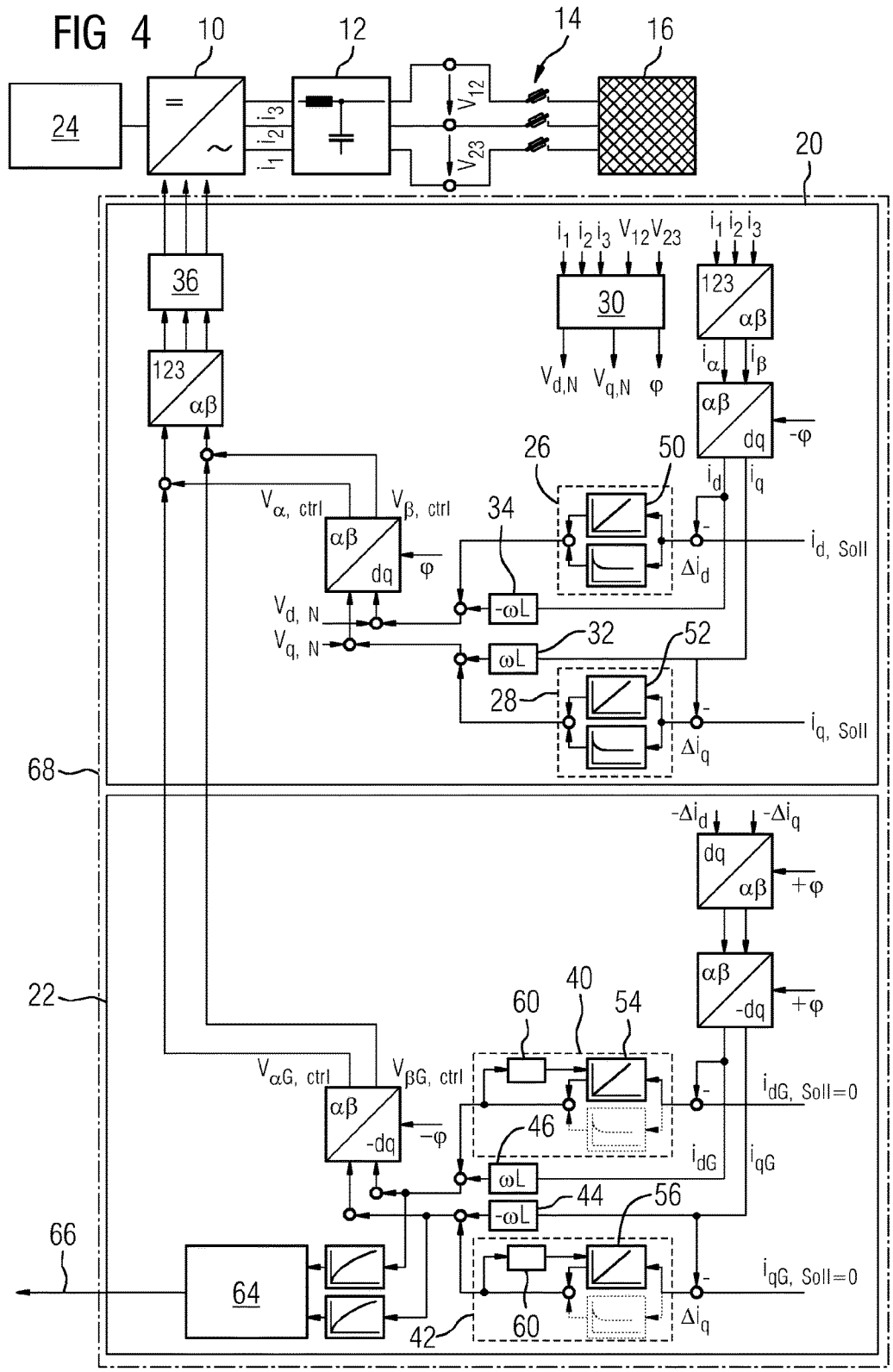
FIG. 4 shows a system according to FIG. 1, FIG. 2 comprising a converter control unit

FIG. 4 illustrates an embodiment of the converter group according to FIG. 1, FIG. 2, comprising a DC link voltage source 24 as well as a positive phase sequence system 20 and a negative phase sequence system 22.

In the normal case of equal amplitudes in the three conductors and 120° phase displacement between the conductor variables, only the positive phase sequence system 20 is non-zero. This means that a current control which impresses the currents in the positive phase sequence system 20 (i.e. in the phase sequence predefined by the line 16) is adequate for use in regular balanced AC lines.

Accordingly, the current controls of converters typically only possess a control loop for the positive phase sequence system 20 comprising a d-current controller 26 and a q-current controller 28. Using a network analyzer 30 or a PLL, the current line phase angle φ and the current line voltage $v_{d,N}$, $v_{q,N}$, for precontrolling the converter output voltage are calculated from the measured currents and/or voltages. By transforming the three phase currents into □□ space vector coordinates, a clear representation in two axes is achieved (Clarke transformation). Another transformation by rotation with the line phase angle φ□ into d/q coordinates (Park transformation) allows the use of steady-state control with integrator component, e.g. in the form of a PI controller or a PID controller, to achieve steady-state accuracy.

Decoupling blocks 32, 34 compensate the coupling of the two space vector axes resulting from the vector rotation into the dq-system. The voltage output vector of the control is converted using a modulator 36 into switching commands for the semiconductor switches of the converter 10. In the time averaged over a switching period, the switching actions at the three-phase converter output result in precisely the output voltage calculated by the controller 26, 28. The line/sine wave filter 12 (typically of LC or LCL design) smooths the fast switching-frequency voltage variations (typically in the kHz range) at the converter output so that, at the point of common coupling to the line 16 (disconnecting point 14), approximately sinusoidal signal responses are produced whose harmonic content is within the applicable guidelines and standards.

Of importance for the applicability of the method proposed here is the fact that the d-q current controllers 26, 28 have an integral-action component, i.e. a single pole at s=0 or very close to the origin of the complex s-frequency domain, (for digital controllers, the corresponding point is at z=1). It is known from systems theory that such transfer elements are stable and do not increase beyond all limits as long as the input variable, i.e. the control deviation, has no steady-state direct component. The d- and q-axes of the control constitute orthogonal components, are therefore decoupled and can be controlled independently of one another. This explains why the controllers 26, 28 can each contain an integrator for both axes, but the control circuit is stable.

For the purpose of active phase failure detection, conventional current control is augmented by a control block for the negative phase sequence system 22 having separate current controllers 40, 42: The desired values for the negative phase sequence system current are usually set to 0. The actual current values of the negative phase sequence system current form, as the control deviation, the input values for the two axes of the negative phase sequence system controllers 40, 42. In the exemplary embodiment, these actual values are efficiently calculated by rotating the current deviation $\Delta i_d$, $\Delta i_q$ from the positive phase sequence system 20 by double vector rotation with the phase angle φ□ (or by single vector rotation with twice the phase angle) into the d-q coordinate system of the negative phase sequence system 22 (corresponding to an oppositely oriented current/voltage system). The advantage of this is that the generally dominant harmonic component of the positive phase sequence system 20 has already been approximately subtracted, as the positive phase sequence system desired value has been removed. Alternatively, the actual current values of the positive and negative phase sequence system 20, 22 could, for example, be extracted from $i_□$ and $i_□$ by bandpass filters in each case. Non-zero negative phase sequence system currents are represented in the positive phase sequence system 20 as a harmonic with twice the line frequency (and vice versa).

A critical factor for the operation of the method is that the d-q negative phase sequence system current controllers 40, 42 likewise have integral-action components (i.e. poles at s=0 or z=1). Additional proportionally or differentially acting controller elements may be present, but are not necessary. In this respect it is preferable for a purely integral-action controller to be provided in the negative phase sequence system 22, as the P(D) element of the positive phase sequence system controller 26, 28 is effective for the entire frequency range. Both the positive phase sequence system 20 and the negative phase sequence system 22 have an additional decoupling block 44, 46. The total output voltage results from adding the output voltage of the negative phase sequence system controllers 40, 42 to the output voltage of the positive phase sequence system controllers 26, 28.

In the fault-free balanced system, the converter currents in the positive phase sequence system 20 and in the negative phase sequence system 22 constitute orthogonal components. These are decoupled and can be controlled independently of one another. The integrators 50, 52; 54, 56 of the controllers 26, 28; 40, 42 of the positive phase sequence system 20 and of the negative phase sequence system 22 are therefore likewise decoupled and do not mutually produce resonance. On the other hand, the disconnection of a line phase results in a structural change in the system, which causes the positive and the negative phase sequence system 20, 22 to be coupled. In the combined overall system of positive and negative phase system currents, a plurality of poles are accordingly produced on the imaginary axis and therefore an instability arises which results in an easily detectable increase in the integral-action components. It can be shown that the integrators of the positive and negative phase sequence system 20, 22 counteract one another in the event of line phase separation, i.e. positive feedback is produced.

The integrators will preferably not be allowed to ramp up to the extent of producing a failure due to overcurrent or overvoltage. It is therefore provided to only allow the integral-action components to ramp up until an alarm threshold for unambiguous detection is exceeded and an indication can be sent to a higher-order controller or operating personnel. Using limiting blocks 60, 62 or anti-windup feedback loops to the integrators 54, 56 of the d-q negative phase sequence system-current controllers 40, 42, an unlimited ramp-up of the negative phase sequence system-integrator is prevented and stable operation maintained. For example, the detection threshold for the negative phase sequence system 22 could be usefully set at 20% of the nominal connection voltage. Depending on the specific application, emergency retraction of the tool of the machine tool or even robust line fault ride-through can be implemented if the detection threshold is reached or exceeded.

The approach proposed here is based on supplementing normal current control for a converter 10 having integrators for adjusting the real and imaginary part of the positive phase sequence system current without permanent control deviation with a negative phase sequence system 22 which itself comprises current controllers 40, 42 having integrators. The current controllers 40, 42 of the negative phase sequence system 22 are designed to counterbalance the complex negative phase sequence system current. The integrators incorporated in the current controllers 40, 42 ensure that the complex negative phase sequence system current is counterbalanced without permanent control deviation. Converter control of this kind is not normally necessary for symmetrical controlled systems, as here no or only minimal excitations are present in the negative phase sequence system 22 and currents and voltages in the negative phase sequence system 22 remain small. Apart from exceptions, the desired value for the complex negative phase sequence system current is set to 0. Even in the undisturbed symmetrical system, the negative phase sequence system control and particularly the integrators thereof have a negligible effect on the system being controlled. In a disturbed system, i.e. a system having a disconnecting point 14 resulting from a high-resistance failure of a line phase, the integrators of the negative phase sequence system 22 act as an initially small, but continuously increasing disturbance in the overall system, which allows the fault to be easily detected.

To detect the fault, a monitoring unit 64 is provided. This is designed and set up to check significant measured und/or calculated variables for a response typical of a fault situation. A measured or calculated value response typical of a fault is e.g. the exceeding of a predefined or predefinable limit value. Measured or calculated values alternatively or cumulatively possible for monitoring by means of the monitoring unit 64 are, for example the absolute values of the integrators of the negative phase sequence system control, the oscillation amplitude of the line current absolute value at twice the line frequency, the oscillation amplitude of the filter voltage absolute value at twice the line frequency, the oscillation amplitude of the DC link voltage at twice the line frequency or the oscillation amplitude of the saturation degree at twice the line frequency.

In the exemplary embodiment shown in FIG. 4, the absolute values of the integrators of the negative phase sequence system control are monitored by means of the monitoring unit 64. In the situation shown, the absolute values of the integrators are low-pass filtered by means of basically optional PT1 elements connected upstream of the monitoring unit 64. If one of the absolute values or both absolute values exceed a predefined or predefinable limit value, this is detected in basically per se known manner by means of the monitoring unit 64 and e.g. a fault signal 66 is generated by means of the monitoring unit 64.

On the basis of such a fault signal 66, a message such as "(line) phase failure detected" can be generated for the operating personnel depending on the requirements of the particular application. By means of evaluation of the fault signal 66 by a higher-level controller (not shown), a suitable reaction can be automatically triggered in the respective process, e.g. a stop, a retraction movement, execution of an emergency program, forwarding of the information to higher-level control structures, etc.

An implementation of the functional units shown in FIG. 4, namely of at least the positive phase sequence system 20 and the negative phase sequence system 22, acts as a converter control unit 68. The positive phase sequence system 20 and the negative phase sequence system 22 are implemented e.g. in software, i.e. as a computer program. In this respect, the converter control unit 68 comprises a per se known processing unit (not show here) in the form or manner of a microprocessor, and a memory (likewise not shown). The memory is loaded with the computer program containing the implementation of the positive phase sequence system 20 and of the negative phase sequence system 22 and, during operation of the converter control unit 68, the computer program is executed by the processing unit, resulting in execution of the approach described here.

Figure 5:
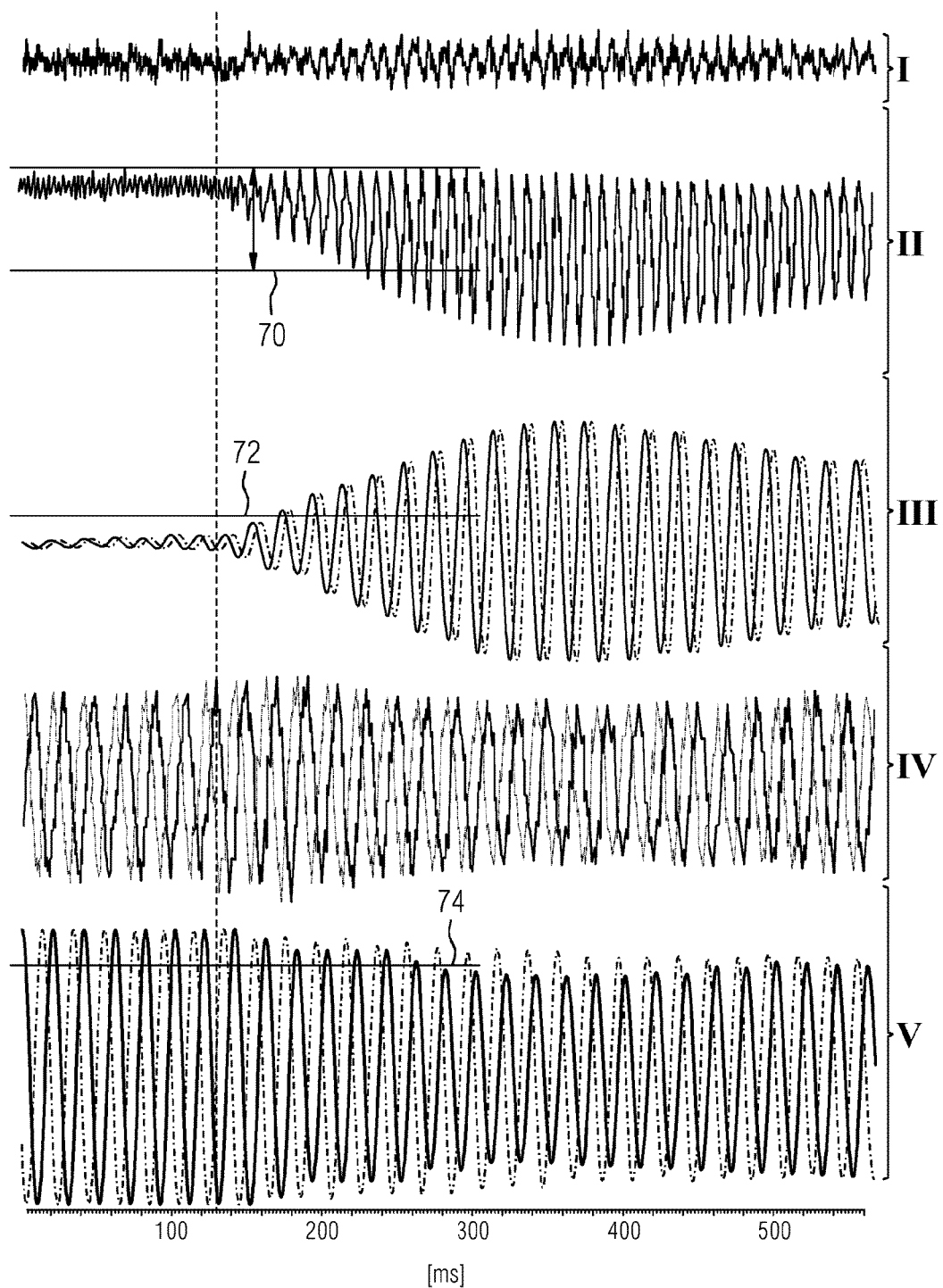
FIG. 5 shows graphs of characteristic variables of the system according to FIG. 4.

FIG. 5 lastly illustrate the same situation as shown previously in FIG. 3, but using the detection system proposed here in the form of the negative phase sequence system 22 with the associated controllers 40, 42. Shown in a first top section is the DC link voltage VDC (section I). The next section down is the degree of saturation, i.e. the output voltage of the converter 10 referred to the DC link voltage (section II). Below that is shown the response of the manipulated variables □ and □ of the negative phase sequence system control (section III) which result from the steady-state d/q controlled variables (in which the integral-action components also operate) by rotation with the 50 Hz line angle φ. The 50 Hz oscillation shown therefore results from the direct component signals of the integral-action components. The instantaneous amplitude of the oscillation corresponds to the instantaneous Integral value. In the next section down, phase currents $i_R$ and $i_S$ between converter 10 and line filter 12 are plotted (section IV), and in a final section the measured filter voltages $u_{F,RS}$ and $u_{F,ST}$ are shown (section V).

The I-components of the controllers 40, 42 for the negative phase sequence system current ensure displacement of the no longer clamped potential at the separated phase—as before the phase S. By the conductor of the phase S no longer being connected to the line 16 (no longer clamped to the line voltage) at the disconnecting point 14, the voltages $u_{F,RS}$ and $u_{F,ST}$ can change. Although no shutdown due to fault has been performed in the example, the line fault is easily detectable, e.g. on the basis of the output amplitude of the negative phase sequence system control or also on the basis of the line-synchronous fluctuation of the saturation degree. The filter voltage amplitudes likewise change significantly, but require the measurement of an external voltage. In the case of the situation shown in FIG. 5 of a test on a 400 V line supply, it follows that the oscillation amplitude is 564 V, the smaller (at the time of consideration) amplitude of the voltages $u_{F,RS}$ and $u_{F,ST}$ decreases with the negative phase sequence system reaction to approx. 400 V, i.e. by about 30%. This is well outside the line voltage tolerance of −15%.

Marked by way of example of this in the diagrams in FIG. 5 are individual limit values 70, 72, 74 that can be monitored individually or cumulatively by the monitoring unit 64, namely a limit value 70 for the oscillation amplitude of the degree of saturation at twice line frequency (section II), a limit value 72 for the level of one of the two integrators (corresponding to the amplitude of the negative phase sequence system oscillation; section III), and a limit value 74 for a minimum value for the amplitude of one/each phase-to-phase line voltage (section V).

The reaching or undershooting or exceeding of such a limit value 70, 72, 74 is a response that is typical of the mentioned coupling of the integrators 50, 52; 54, 56. By monitoring the respective measured or calculated values and identifying the limit value violation as a response typical of the coupling of the integrators 50, 52; 54, 56, the monitoring unit 64 has automatically detected the underlying line fault. The monitoring unit 64 generates the fault signal 66 to indicate the line fault detected.

Although the invention has been illustrated and described in detail on the basis of the exemplary embodiment, the invention is not limited by the example(s) disclosed and other variations will be apparent to persons skilled in the art without departing from the scope of protection sought for the invention.

Individual salient aspects of the description presented here may be briefly summarized as follows: To detect phase failures, in particular phase failures in the form of line faults, an active detection method is proposed which selectively brings about state changes in the system affected by the phase/line fault in order to obtain significant and detectable signal changes and, by means of threshold value comparisons, to detect the disturbed state even under no-load conditions. The active method is designed such that, in the undisturbed operating state, the behavior of the system remains virtually unchanged. Specifically, no dedicated test signals that would represent a deviation from the ideal response of the output voltage and therefore create undesirable line reactions are injected into the line 16. Instead, the control of the converter 10 is implemented such that in the event of a phase failure/line fault (phase interruption), a change in the control structure results. This means that functional units (integrators of the current controllers 26, 28; 40, 42) that are not coupled to one another during normal operation are coupled, and feedback loops are created which only then result in a continuously increasing and automatically detectable fault signal if the structure change occurs because of the phase/line fault.

What is claimed is:

1. A method for detecting phase failures in a converter, the method comprising:
controlling current of the converter with first current controllers of a positive phase sequence system having first integrators and with second current controllers of a negative phase sequence system having second integrators,
wherein the first integrators and the second integrators are decoupled without a line disturbance,
in the event of a line fault, coupling the previously decoupled first and second integrators;
checking with a monitoring unit at least one measured or calculated value for a response typical of the coupling of the first and second integrators; and
with the monitoring unit generating a fault signal when such typical response is detected,
wherein the at least one measured or calculated value comprises at least one value selected from the group consisting of
an absolute value of the second integrators,
an oscillation amplitude of a line current absolute value at twice a line frequency,
an oscillation amplitude of a filter voltage absolute value at twice the line frequency,
an oscillation amplitude of a DC link voltage at twice the line frequency, and
an oscillation amplitude of a saturation degree at twice the line frequency.

2. The method of claim 1, further comprising monitoring with the monitoring unit whether absolute values of the second integrators exceed a predefined limit value, and generating with the monitoring unit the fault signal when the predefined limit value is exceeded.

3. The method of claim 1, further comprising preventing with limiting blocks assigned to the second integrators an unlimited ramp-up of the second integrators.

4. The method of claim 1, wherein the negative phase sequence system is activated depending on an average power consumption of the converter.

5. The method of claim 1, wherein the negative phase sequence system is deactivated when an average power consumption of the converter exceeds a predefined limit value.

6. The method of claim 1, wherein the second current controllers process, as input values, a current control deviation from the positive phase sequence system that is rotated by vector rotation into a coordinate system of the negative phase sequence system.

7. A device for detecting phase failures in a converter, comprising:
first current controllers of a positive phase sequence system having first integrators, and second current controllers of a negative phase sequence system having second integrators, the first and second current controllers configured to control a current of the converter,
wherein the first integrators and the second integrators can be operated decoupled without line disturbance,
wherein, in the event of a line fault, the previously decoupled first and second integrators are coupled, and
a monitoring unit configured to detect at least one measured or calculated value for a response typical of the coupling of the first and second integrators, and to generate a fault signal when such a typical response is detected,
wherein the at least one measured or calculated value comprises at least one value selected from the group consisting of
an absolute value of the second integrators,
an oscillation amplitude of a line current absolute value at twice a line frequency,
an oscillation amplitude of a filter voltage absolute value at twice the line frequency,
an oscillation amplitude of a DC link voltage at twice the line frequency, and
an oscillation amplitude of a saturation degree at twice the line frequency.

8. The device of claim 7, comprising a converter control unit having a processor and a memory storing program code instructions, wherein when the processor executes the program code instructions from the memory, the converter control unit causes the device to detect the phase failures in the converter.

9. A computer program having program code instructions stored on a non-transitory storage medium, wherein when the program code instructions are loaded into memory of a processor of the converter control unit and executed by the processor, cause the converter control unit to detect phase failures in a converter by:
controlling current of the converter with first current controllers of a positive phase sequence system having first integrators and with second current controllers of a negative phase sequence system having second integrators,
wherein the first integrators and the second integrators are decoupled without a line disturbance,
in the event of a line fault, coupling the previously decoupled first and second integrators;

checking with a monitoring unit at least one measured or calculated value for a response typical of the coupling of the first and second integrators; and with the monitoring unit generating a fault signal when such typical response is detected, wherein the at least one measured or calculated value comprises at least one value selected from the group consisting of an absolute value of the second integrators, an oscillation amplitude of a line current absolute value at twice a line frequency, an oscillation amplitude of a filter voltage absolute value at twice the line frequency, an oscillation amplitude of a DC link voltage at twice the line frequency, and an oscillation amplitude of a saturation degree at twice the line frequency.

* * * * *